March 5, 1946.  D. FERGUSSON  2,395,963
SEAL FOR JOINTS
Filed Nov. 26, 1942
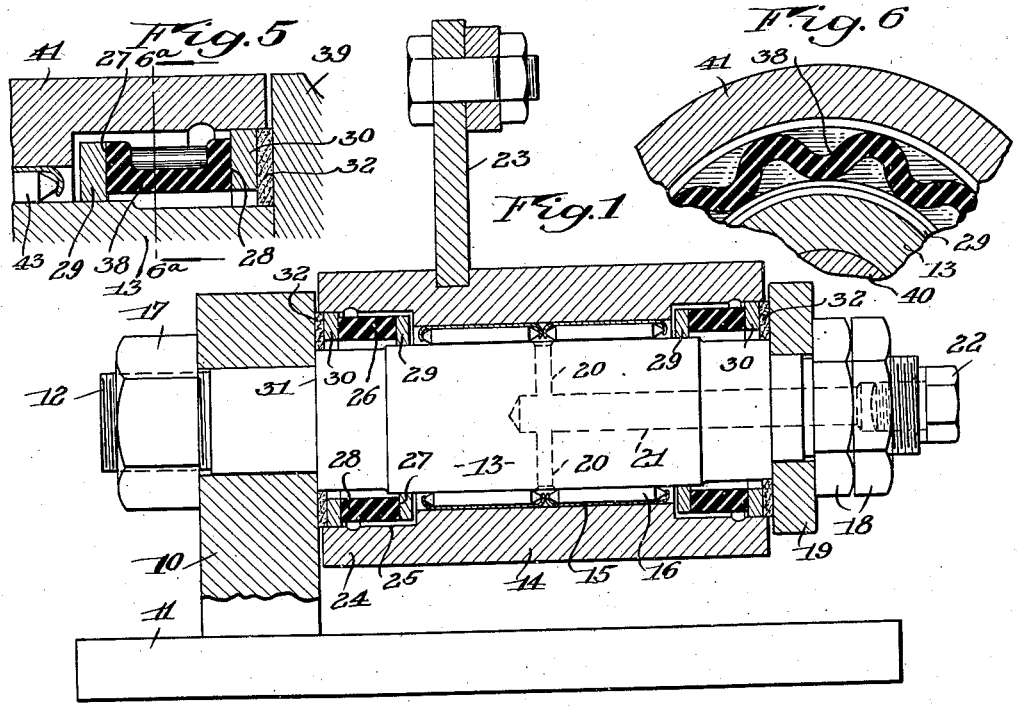
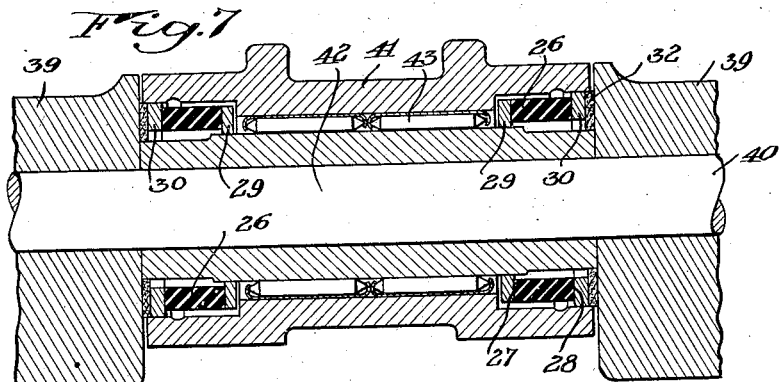
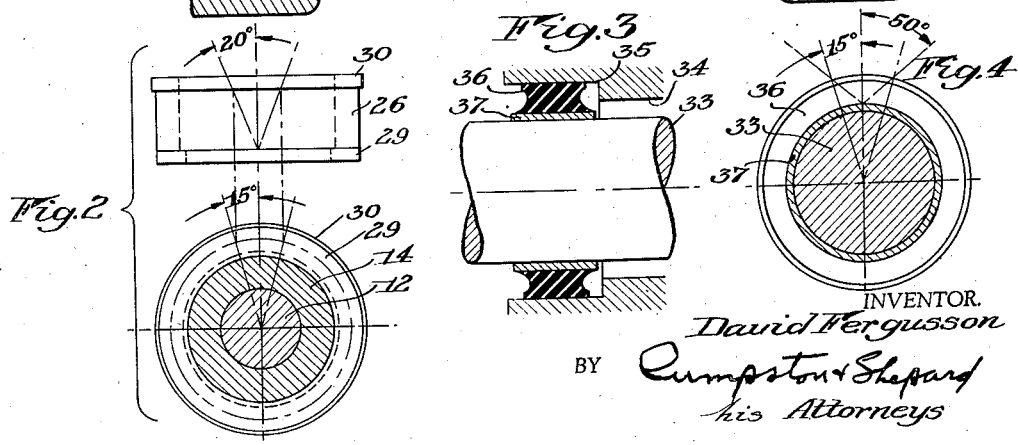
INVENTOR.
David Fergusson
BY Cumpston & Shepard
his Attorneys Patented Mar. 5, 1946

2,395,963

UNITED STATES PATENT OFFICE 2,395,963

SEAL FOR JOINTS

David Fergusson, Rochester, N. Y., assignor to James Cunningham, Son & Company, Rochester, N. Y., a partnership composed of Augustine J. Cunningham and Francis E. Cunningham Application November 26, 1942, Serial No. 466,978

3 Claims. (Cl. 286—11)

This invention relates to seals for joints between relatively oscillating parts and, more particularly, to devices for sealing-in cooperating bearing surfaces, excluding dust, sand and other foreign matter, and protecting the bearing surfaces against injury thereby. One object of the invention is to provide a sealed joint of the above character having a more durable and efficient type of construction.

Another object is to provide such a joint having its bearing surfaces sealed in by a flexible diaphragm of rubber, or other elastic material, so constructed as to avoid excessive deformation of the elastic material, for a given diameter and range of oscillation of a bearing, in order to protect the diaphragm and substantially increase its durability.

To these and other ends the invention resides in certain improvements and combinations of parts, all as will be hereinafter more fully described, the novel features being pointed out in the claims at the end of the specification.

In the drawing:

Fig. 1 is a central, sectional elevation of a sealed joint embodying the present invention;

Fig. 2 is a diagrammatic view showing the relation between the angle of oscillation in such a joint and the angle of torsional deformation of the sealing diaphragm;

Fig. 3 is a sectional elevation of a sealed joint of the prior art;

Fig. 4 is a diagrammatic view showing the relation between the angles of oscillation and torsional deformation in a joint such as shown in Fig. 3;

Fig. 5 is an enlarged, sectional elevation of a modified sealing diaphragm;

Fig. 6 is an enlarged, sectional view on the line 6a—6a in Fig. 5, and

Fig. 7 is a view similar to Fig. 1, but showing an application of the invention to a different type of joint.

The invention is capable of application to a wide variety of uses and of various suitable embodiments. One such embodiment is illustrated in Fig. 1 of the drawing as adapted for use with the supporting joint or bearing of an oscillating bell crank, for example, such as commonly employed in machine construction. This embodiment comprises a support 10, on a frame or base 11, and having fixed therein, in any suitable manner, a spindle 12. The spindle is formed with a journal 13 on which a bearing sleeve 14 is mounted for oscillation about the axis of the spindle. The sleeve has an inner bearing surface 15 for cooperation with the journal, preferably through interposed roller or needle bearing means 16, to reduce friction, as well understood in the art. The sleeve 14 is retained on the spindle, and the spindle in support 10, by means of a nut 17 on the spindle bearing against the support and a pair of lock nuts 18 at the other end of the spindle supporting a collar 19 adjacent to the outer end of the sleeve, as hereafter more fully described. The journal and sleeve bearing surfaces are preferably lubricated by material transmitted thereto through channels 20, branching from a central channel 21 leading inwardly through one end of the spindle and accessibly closed by means of a nut or cap 22. At 23 is one arm of a bell crank lever having the sleeve 14 as its hub and mounted for oscillation on spindle 12, as commonly employed in the construction of machines and like mechanisms.

The present invention involves the combination with such a joint, or bearing, of a flexible element, or diaphragm, of rubber or other resilient material, so associated with each end of the joint as to hermetically seal-in its lubricated bearing surfaces and prevent the entrance of foreign matter. To this end the bearing sleeve 14 is preferably extended at each end, as at 24, beyond the bearing surfaces, such extension providing a chamber 25, to accommodate the sealing parts including the said sealing diaphragm. These extensions of sleeve 14 may be slightly enlarged internally, as shown, without enlarging the sleeve, if necessary to afford sufficient space for the sealing parts in chamber 25. As these sealing parts may be the same at each end of the bearing, a description in connection with one end will apply to the other as well.

The sealing element or diaphragm is preferably in the form of a flexible, circumferentially extending band or tube 26, of rubber-like or other resilient material, and has its opposite edges 27 and 28 secured to the spindle 12 and bearing sleeve 14, respectively, by cementing, vulcanizing, or other known or suitable form of adhesive attachment affording a hermetically sealed connection. The band is associated with the spindle and sleeve in accordance with a principle of arrangement in which its critical dimension, or width from edge to edge, extends axially of the joint, in which direction it may readily be given a width designed to suit a given diameter and range of oscillation of a bearing sleeve, for the purpose of avoiding excessive deformation of the flexible sealing element and so prolonging its life.

Such arrangement of the sealing diaphragm or band is preferably accomplished by vulcanizing its opposite edges, 27 and 28, to spaced anchoring means inserted in chamber 25 and secured to the journal and sleeve, respectively. Such anchoring means, in the present instance, are provided by a pair of collars, spaced from each other axially of the joint. One of these collars, in the form of a washer 29, has a driving fit on the adjacent end of the journal surface 13 and extends radially outwardly into closed spaced relation with the wall of chamber 25. The other collar, in the form of a similar washer, 30, has a driving fit in the chamber 25, near its outer end, and extends radially inwardly into closely spaced relation with the opposite surface 31 of the spindle. The sealing band 26, vulcanized at its opposite edges to these washers, respectively, is thus arranged with its critical dimension, or width, extending axially and preferably, though not necessarily, parallel with the axis of the joint or bearing, so as to be substantially cylindrical in shape, as shown.

The above parts are assembled before attachment of the spindle to support 10, and a thin sleeve tool is inserted about the spindle within the washer 30 and the band 26, so as to engage washer 29, for driving it into place on the journal surface, washer 30 being concurrently driven into place in the end of the chamber. A washer 32 of cork, felt, or other known and suitable material, is preferably fitted closely around the spindle and within the end of the chamber, to form an outer mud seal to prevent the entry of dirt, or other foreign matter, or the formation of ice, inside the band 26. A similar protective washer is provided for the seal at the other end of the bearing and after such assembly of the parts, the spindle is drawn into its bore in support 10 and secured by means of nut 17, and collar 19 is secured in place by means of the lock nuts 18.

It will be apparent from the described construction that the oscillation of the sleeve on the journal produces a torsional deformation in the sealing diaphragm or band 26, in an axial, rather than a radial, direction. Since any bearing pressures or stresses are taken wholly by the cooperating bearing surfaces of the journal and sleeve, and the band is entirely free from any such forces, it may be made comparatively thin in a radial direction, with its width as its major cross-sectional dimension. This axial dimension may obviously be increased as desired, so as to reduce the angle of torsional deformation for a given diameter and range of oscillation of the sleeve. This is illustrated diagrammatically in Fig. 2, where the bearing sleeve and the attached edge of the sealing diaphragm have an oscillation in either direction of 15°. This degree of oscillation is shown as projected from the lower elevational view to an upper plan view of the band, and produces, for a band having a width of the order shown, an angle of torsional deformation of only 20°, which is well within the range of elasticity of available elastic materials.

The above limited deformation of the present sealing diaphragm is further illustrated by comparison with a seal of the prior art shown in Figs. 3 and 4. Fig. 3 shows a journal 33 in a bearing sleeve 34 having a sealing chamber 35. A rubber ring 36 is vulcanized on a metal collar 37 having a driving fit on the journal, the rubber sealing ring being compressed in the chamber so as to tightly engage its wall and seal the bearing surfaces. In such a construction, the oscillation of the sleeve produces a torsional deformation in the rubber ring 36 extending in a radial direction. The dimension of the rubber ring in this direction is limited by the diameter of the sleeve or its chamber 35, with the result that the angle of torsional deformation is necessarily high. This is shown diagrammatically in Fig. 4, from which it will be seen that the same oscillating angle of 15° in the bearing produces in this construction a much larger torsional deformation in the rubber ring, approximating a deformation angle in the rubber of 50°. Sealed bearings of this prior character in which track chains, for example, have commonly required replacement after a limited usage of, say, three thousand miles of travel of the vehicle. By the present invention, the useful life of such a seal is multiplied several times.

The sealing band, instead of the substantially cylindrical shape shown in Figs. 1 and 2, may have the modified form shown in Figs. 5 and 6, in which the central zone of the band is of reduced thickness, as shown at 38, and is formed with axially extending corrugations. By this means, the major central portion of the width of the band is given an increased effective elasticity, since these corrugations tend to straighten out and relieve torsional deformation and stress in the material and so increase its durability.

A modified embodiment of the invention is illustrated in Fig. 7, in adaptation to a different type of joint, namely, a joint between adjacent hinged links of a chain, such as a tread chain for track laying vehicles. This embodiment comprises a pairs of spaced links 39 of such a chain, connected by a spindle 40, which may have a driving fit in such links. An intermediate link is formed with a bearing sleeve 41 cooperating with the intermediate journal portion 42 of the spindle, through interposed lubricated roller or needle bearings 43, as well understood in the art. These bearing surfaces are shown equipped, at each end of sleeve 41, with sealing devices of the above construction, which will be understood without repetition of a description of the same. The function and operation of the parts in this modification are substantially the same as described in connection with the foregoing embodiment, the sleeve 41 and its associated link oscillating on the journal 42, as the chain passes around its supporting and driving wheels, as well understood in the art. The bearing surfaces are hermetically sealed against dirt and injury by the durable sealing diaphragms 26, as already described.

The sealing diaphragms or bands may be made of any known and suitable material, such, for example, as natural or synthetic rubber materials of suitable flexibility, elasticity and durability, a good commercially available, natural rubber material, corresponding to about 30 to 40 units of the durometer scale, having been found highly satisfactory in use. The term "rubber-like" is herein employed as comprehending all such materials. The collars or washers 29 and 30 may be advantageously constructed of steel, bronze, or plastic materials, as particular applications and conditions may indicate.

The invention provides a sealed joint construction in which the critical dimension of the sealing diaphragm and its angle of deformation may be controlled to protect the diaphragm and increase its durability as desired, without affecting the diameter or range of oscillation of the bearing sleeve, thus affording a marked improvement over the limited life of the sealed joints of the prior art.

It will thus be seen that the invention accomplishes its objects and while it has been herein disclosed in connection with the details of several embodiments, it is to be understood that such disclosure is intended by way of illustration, rather than in a limiting sense, as it is contemplated that various changes in the construction and arrangement of the parts will readily occur to those skilled in the art within the spirit of the invention and the appended claims.

I claim:

1. A seal for a joint between an inner shaft member and an outer sleeve member mounted on said shaft member for relative oscillatory movement between said members about the axes of said members, said seal comprising an axially extending portion of said sleeve member radially spaced from said shaft member to provide a chamber, a pair of separately formed collars in said chamber, one fixed on and extending radially outwardly from said shaft member, and the other fixed on and extending inwardly from said sleeve, said collars being substantially spaced from each other axially of said members, and a tube of rubber-like material having its major cross-sectional dimension extending continuously from one to the other of said collars in said chamber with its opposite ends adhesively attached to said collars to tightly seal one of said members to the other, and to afford a low angle of torsional deformation of said tube for a given diameter thereof and range of relative oscillation between said members.

2. A seal for a joint between an inner shaft member and an outer sleeve member mounted on said shaft member for relative oscillatory movement between said members about the axes of said members, said seal comprising an axially extending portion of said sleeve member radially spaced from said shaft member to provide a chamber, a pair of collars in said chamber, one fixed on and extending radially outwardly from said shaft member, and the other fixed on and extending inwardly from said sleeve, said collars being substantially spaced from each other axially of said members, and a tube of rubber-like material extending from one to the other of said collars in said chamber with its opposite ends adhesively attached to said collars to tightly seal one of said members to the other, and to afford a low angle of torsional deformation of said tube for a given diameter thereof and range of relative oscillation between said members, said tube being formed with axially extending corrugations to accommodate such torsional deformation.

3. A seal for a joint between an inner shaft member and an outer sleeve member mounted on said shaft member for relative oscillatory movement to swing the members about the axes of said members and having an axially extending portion radially spaced from said shaft member to provide a chamber, said seal comprising a pair of rings in said chamber, one of said rings having a driving fit on said shaft member and the other of said rings having a driving fit in said sleeve member, said rings being axially spaced from each other, and an integral flexible annular tube of elastic material having its major cross-sectional dimension extending axially of said members, the ends of said tube being adhesively attached to said rings, respectively, to hermetically seal one of said members to the other and afford a low angle of torsional deformation for a given diameter and range of oscillation of said sleeve.

DAVID FERGUSSON.